United States Patent
Suilen et al.

(10) Patent No.: US 7,981,203 B2
(45) Date of Patent: Jul. 19, 2011

(54) HOT MELT INK

(75) Inventors: Frederik L. E. M. Suilen, Swalmen (NL); Marcus P. L. Huinck, Herten (NL); Jaap H. A. Smits, Rotterdam (NL)

(73) Assignee: OCE-Technologies B.V., Venlo (NL)

( * ) Notice: Subject to any disclaimer, the term of this patent is extended or adjusted under 35 U.S.C. 154(b) by 11 days.

(21) Appl. No.: 12/363,335

(22) Filed: Jan. 30, 2009

(65) Prior Publication Data
US 2009/0165670 A1 Jul. 2, 2009

Related U.S. Application Data

(63) Continuation of application No. PCT/EP2007/057815, filed on Jul. 30, 2007.

(30) Foreign Application Priority Data

Aug. 1, 2006 (EP) .................................. 06118245

(51) Int. Cl.
*C09D 11/00* (2006.01)
(52) U.S. Cl. ................................... 106/31.29
(58) Field of Classification Search ............... 106/31.29
See application file for complete search history.

(56) References Cited

U.S. PATENT DOCUMENTS

| 6,248,161 | B1 | 6/2001 | Nguyen et al. | |
|---|---|---|---|---|
| 6,530,985 | B1 * | 3/2003 | Matsumoto et al. | 106/31.47 |
| 6,682,587 | B2 | 1/2004 | Hendricks et al. | |
| 6,846,351 | B2 * | 1/2005 | Iwamoto et al. | 106/31.47 |
| 6,936,096 | B2 | 8/2005 | Huinck | |
| 2004/0106782 | A1 * | 6/2004 | Iwamoto et al. | 534/653 |
| 2006/0032397 | A1 * | 2/2006 | Banning et al. | 106/31.29 |

FOREIGN PATENT DOCUMENTS

| EP | 1 020 498 A1 | 7/2000 |
|---|---|---|
| EP | 1 067 157 A1 | 1/2001 |
| EP | 1 475 418 A1 | 11/2004 |
| JP | 2-16171 A | 1/1990 |

* cited by examiner

*Primary Examiner* — Jerry Lorengo
*Assistant Examiner* — Veronica Faison Gee
(74) *Attorney, Agent, or Firm* — Birch, Stewart, Kolasch & Birch, LLP

(57) ABSTRACT

An ink composition which is solid at room temperature and liquid at a higher temperature, containing a substantially non-aqueous carrier composition and at least one dye, formed by at least one salt of the anthrapyridone series.

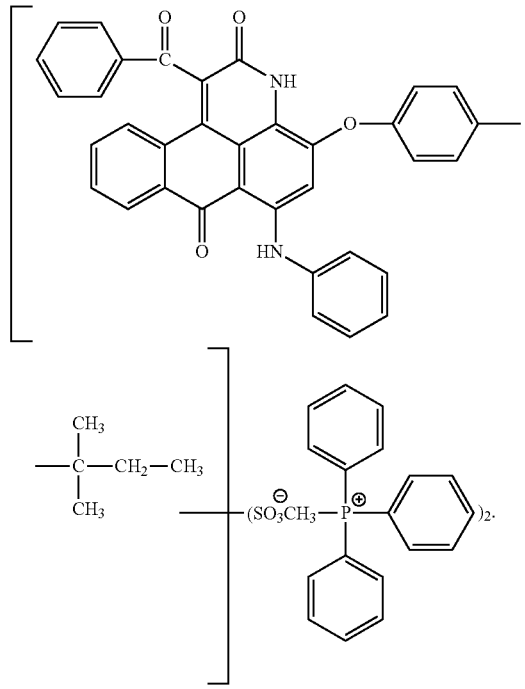

10 Claims, No Drawings

HOT MELT INK

CROSS-REFERENCE TO RELATED APPLICATIONS

This application is a Continuation of International Application No. PCT/EP2007/057815, filed on Jul. 30, 2007, and for which priority is claimed under 35 U.S.C. §120, and claims priority under 35 U.S.C. §119(a) to Application No. 06118245.7, filed in Europe on Aug. 1, 2006. The entirety of each of the above-identified applications is expressly incorporated herein by reference.

BACKGROUND OF THE INVENTION

The present invention relates to an ink composition which is solid at room temperature and liquid at a higher temperature, comprising a substantially non-aqueous carrier composition and at least one dye.

An ink composition of this kind, which is also known as a hot melt ink, is known from U.S. Pat. No. 6,936,096. This patent describes a hot melt ink to be applied in ink jet printing devices, comprising a non-aqueous carrier, and at least one dye of the anthrapyridone series, in particularly C.I Solvent Red 149. The dye C.I. Solvent Red 149 has a very fresh magenta color with sufficient strength and clarity. A disadvantage of the known hot melt ink is that the anthrapyridone dye often migrates on a receiving substrate, in particular during or after laminating the printed receiving substrate with another material (layer), such as, e.g., a transparent, flexible layer of polyvinylchloride (PVC). This migration causes a deterioration in the quality of the image printed on the receiving substrate by means of the anthrapyridone dye. More specifically, the undesired dye shift is detrimental to the sharpness of the image transferred to the receiving substrate.

SUMMARY OF THE INVENTION

The object of the invention is to provide a hot melt ink which obviates the above-described disadvantage.

To this end, an ink composition has been developed wherein the dye is formed by at least one salt of the anthrapyridone series. It has been surprisingly found that an ink of this kind is more stable than the known ink, as the salt (acting as a derivative dye) of an anthrapyridone, in particular a magenta anthrapyridone, lessens the tendency to migrate on a receiving substrate. This allows the receiving substrate, on which the ink composition of the present invention is applied to be subjected to lamination without affecting the image quality. The salt of the anthrapyridone is considered as a chemical modification of an anthrapyridone dye known from the Color Index (C.I.). For example, the salt of the ink composition comprises an anion of a known anthrapyridone dye, and a suitable cation bonded to the anion to counteract dye migration. In this context use of a substantially non-aqueous carrier means a carrier which is not substantially based on water (acting as a vehicle). The non-aqueous carrier preferably comprises less than 15 mass percent of water, more preferably less than 10 mass percent of water, and even more preferably less than 5 mass percent of water, and most preferably less than 2 mass percent of water. It should be noted that ink compositions are known in the prior art which comprise an aqueous carrier, and a dye formed by a salt of an anthrapyridone dye. However, these aqueous inks have significantly different characteristics than non-aqueous hot melt inks according to the present invention. In particular, the problem of migration of the colorants after lamination of a printed substrate is not known in conjunction with the use of these water-based inks. Examples of aqueous inks in which the dye is formed by a salt of an anthrapyridone dye are disclosed, e.g., in JP 02-016171 and in U.S. Pat. No. 6,248,161.

In a preferred embodiment the salt comprises at least one phosphonium group and/or at least one ammonium group. The application of one or more phosphonium groups and/or one or more ammonium groups is considered to be advantageous, since these groups will provide the salt a relatively good thermostability. The phosphonium group and/or the ammonium group will commonly make part of a cation of the salt bonded to the anionic anthrapyridone. Moreover, the use of a phosphonium salt will commonly not lead to an observable emission of odors.

In an alternative preferred embodiment the salt comprises a cation derived from the group consisting of triphenylmethylphosphonium bromide, N-methyl-N,N-dioctyl-1-octanaminium chloride, tetrabutylphosphonium bromide, Primene™ 81-R (a primary aliphatic amine available at Rohm and Haas, USA), 1,3di-o-tolylguanidine, butyltriphenylphosphonium chloride, ethyltriphenylphosphonium bromide, tributyloctylphosphonium bromide, tetrabutylammonium bromide, tetrapentylammonium bromide, and tripentylamine.

It has further been found that it is advantageous to force a chemical reaction between an anthrapyridone and a cationic triphenylmethylphosphonium (TMP) bromide available from Aldrich. This reaction will commonly have a relatively high yield. Moreover, this reaction can be initiated relatively easily. During the reaction between the anthrapyridone molecule and at least one triphenylmethylphosphonium bromide molecule, at least one ion (depending on the type of anthrapyridone used, for example a $Na^+$ ion or a $H^+$ ion) will be removed from the anthrapyridone molecule, and a bromide ion ($Br^-$) will be removed from each triphenylmethylphosphonium bromide molecule. The salt obtained thus comprises anionic anthrapyridone and cationic triphenylmethylphosphonium (TMP).

To facilitate the formation of the salt, the anthrapyridone (used as starting material to form the salt) preferably comprises at least one sulphonic acid group and/or a derivative thereof. Sulphonic acid groups and derivatives thereof are commonly relatively reactive which considerably facilitates the chemical modification of the anthrapyridone. Moreover, the application of one or more sulphonic groups and derivatives thereof will commonly lead to a relatively thermostable dye.

An anthrapyridone to prepare the colored salt for an ink composition according to the present invention can be represented by formula (1):

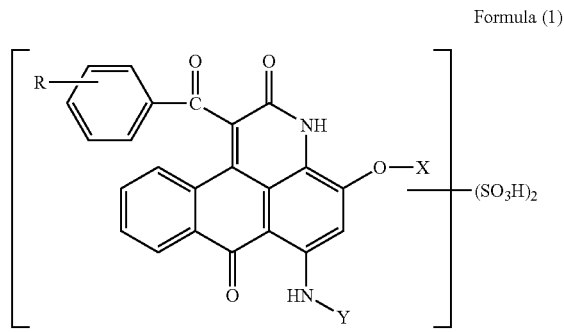

Formula (1)

wherein X stands for a member selected from the group consisting of phenyl, alkylphenyl and cycloalkylphenyl groups, Y stands for a member selected from the group consisting of phenyl, alkylphenyl, phenoxyphenyl, chlorophenyl, bromophenyl, diphenyl and tetrahydronaphtyl radicals, and R is a member selected from the group consisting of hydrogen, methyl, chloride, bromide, methoxy and nitro. An advantage of the use of such an anthrapyridone molecule to prepare the colored salt is that the salt obtained will commonly have a relatively good and durable color-resistance.

In one embodiment, the dye of the ink composition according to the present invention comprises a salt represented by formula (2):

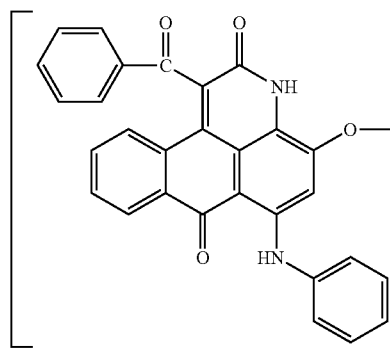
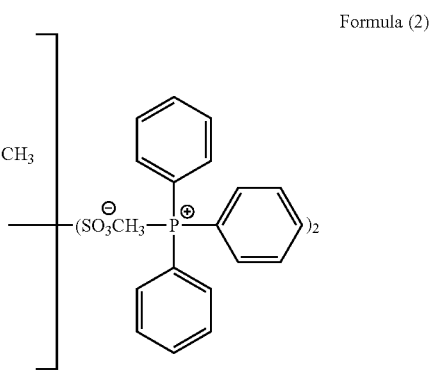

Formula (2)

The salt represented above comprises an anionic magenta anthrapyridone, in particular C.I. Acid Red 143:1, and cationic TMP. C.I. Acid Red 143:1 is available from Nippon Kayaku, Tokyo, Japan. This product is considered to be relatively pure, wherein practically every molecule comprises two sulphonic acid groups. In an acceptable alternative embodiment the dye comprises a salt represented by formula (3):

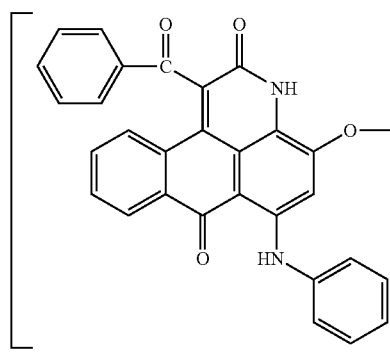
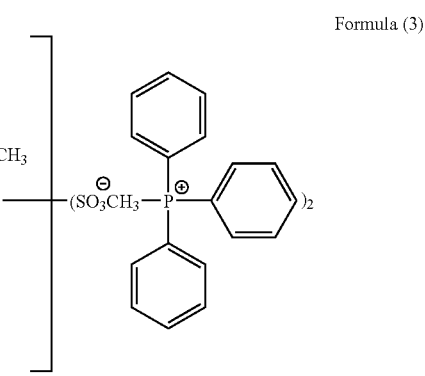

Formula (3)

The salt represented above comprises an anionic magenta anthrapyridone, in particular C.I. Acid Red 143, and cationic TMP. C.I. Acid Red 143 is available from Clariant AG, Basel, Switzerland. Although this product is considered as being less pure than C.I Acid Red 143:1, a satisfying and relatively stable salt can still be obtained with this compound. A common advantage of the application of C.I. Acid Red 143:1 and C.I. Acid Red 143 is that these compounds hardly influence the viscosity of the ink composition of the present invention in a noticeable manner.

DETAILED DESCRIPTION OF THE INVENTION

The present invention will now be explained with reference to the following non-limitative examples, wherein: Example 1 is an ink composition according to the present invention; Example 2 shows, in general, a method for preparing an ink composition according to the present invention, and Example 3 shows a method for preparing an ink composition according to the present invention based on C.I. Acid Red 143.

Example 1

A hot melt ink according to the present invention is based on a carrier composition containing 65% by weight of the bis-ester formed from the reaction of 1,4-dimethanol trans-cyclohexane and 2 mol-equivalents of orthomethylbenzoic acid. This compound, also known as Cyclo-2T, is disclosed in EP 1 067 157 (Table 2, under D, compound 17). In addition, the carrier composition contains 35% by weight of an amorphous component which is a mixture of different compounds. This amorphous component can be obtained as explained in example 3 of U.S. Pat. No. 6,936,096. The dye added per 100 g of carrier composition is 4 g of the salt of TMP and C.I. Acid Red 143, which is available from Clariant AG, Basel, Switzerland. Alternatively, instead of using 65% of the above mentioned compound, inks can be formulated comprising 65% of the crystalline component according to formula II as mentioned in U.S. Pat. No. 6,682,587 (for example compound 8 as mentioned in table 3 of this '587 patent).

Inks obtained in this way appear to have a sparkling magenta color that will hardly show any visible migration of the coloring material when transferred to a plain paper receiving material. Even in the case where the receiving material is subsequently laminated with another layer, e.g., a transparent foil, the transferred image will substantially retain its sharpness and image quality.

Example 2

Example 2 shows, in general, a method for preparing an ink composition according to the present invention. As starting material an anthrapyridone chromophore (acid dye) is used, provided that the chromophore comprises one or multiple functional groups which may be subjected to a chemical reaction to form a salt. Calculate the molar quantity counter ion with regard to the number and nature of functional groups. Use a molar ratio of the chromophore with respect to the counter ion of about 1:0.85 (to reduce the risk of fouling of the salt to be prepared by the counter ion). Dissolve a quantity of the dye in water, wherein the dye quantity is about 1/10 times the quantity of water used (based on the mass of the dye). Add, dropwise, a highly-concentrated solution of the counter ion while stirring well. Subsequently, add dropwise, a quantity of dichloromethane to the solution while stirring well, wherein the quantity of dichloromethane is more or less similar to the quantity of water used. Allow the mixture to separate into different phases by allowing the mixture to rest. Remove the aqueous layer of the separated mixture. Rinse the dichloromethane two to three times, each time with more or less a similar amount of water. Filter the dichloromethane and concentrate the dichloromethane by evaporation. The remaining product is the salt of the chromophore and the counter ion.

Example 3

Example 3 shows a method for preparing an ink composition according to the present invention based on C.I. Acid Red 143. Weigh 200 g C.I. Acid Red 143 (available from Clariant, Basel, Switzerland, under the tradename Lanasyn Red F-5B). Add this quantity of C.I. Acid Red 143 to a beaker and dissolve the C.I. Acid Red 143 in about 2 l demineralized water at room temperature. Prepare a solution of 135 g triphenylmethylphosphonium bromide in 400 ml demineralised water. Add this latter solution, dropwise, to the C.I. Acid Red 143 solution while stirring well. The formation of the salt will be initiated directly. Subsequently, add 2 l dichloromethane dropwise to the beaker while stirring well. Allow the beaker to rest for about one hour to achieve a satisfying separation of the two different phases. After separation of the two layers, the top layer (aqueous layer) has to be removed. Rinse the dichloromethane two to three times, each time with about 2 l of water to wash out generated ancillary salts. After filtration of the dichloromethane layer, this layer has to be concentrated by evaporation at 45° C. The remaining solvent is evaporated in vacuum. The product formed by this method is the salt of triphenylmethylphosphonium bromide and C.I. Acid Red 143.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An ink composition which is solid at room temperature and liquid at a higher temperature, comprising a substantially non-aqueous carrier composition and at least one dye, said dye being at least one salt of the anthrapyridone series.

2. The ink composition according to claim 1, wherein the dye comprises a salt of a magenta anthrapyridone.

3. The ink composition according to claim 1, wherein the salt comprises at least one phosphonium group and/or at least one ammonium group.

4. The ink composition according to claim 1, wherein the salt comprises a cation selected from the group consisting of triphenylmethylphosphonium bromide, N-methyl-N,N-dioctyl-1-octanaminium chloride, tetrabutylphosphonium bromide, a primary aliphatic amine, 1,3-di-o-tolylguanidine, butyltriphenylphosphonium chloride, ethyltriphenylphosphonium bromide, tributyloctylphosphonium, tetrabutylammonium bromide, tetrapentylammonium bromide, and tripentylamine.

5. The ink composition according to claim 1, wherein the salt of the anthrapyridone series comprises at least one sulphonic acid group and/or a derivate thereof.

6. The ink composition according to claim 5, wherein the anthrapyridone for preparing the salt is represented by the formula:

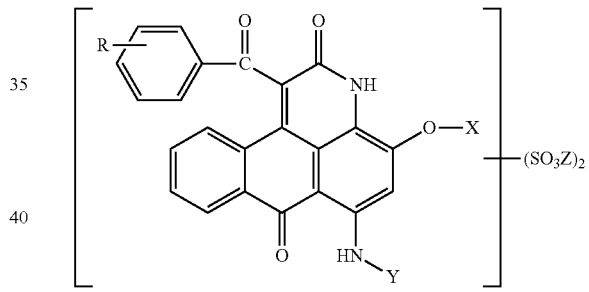

wherein X is a member selected from the group consisting of phenyl, alkylphenyl and cycloalkylphenyl groups, Y is a member selected from the group consisting of phenyl, alkylphenyl, phenoxyphenyl, chlorophenyl, bromophenyl, diphenyl and tetrahydronaphtyl radicals, Z is a positive counter ion, and R is a member selected from the group consisting of hydrogen, methyl, chloride, bromide, methoxy and nitro.

7. The ink composition according to claim 6, wherein the dye comprises a salt represented by the formula:

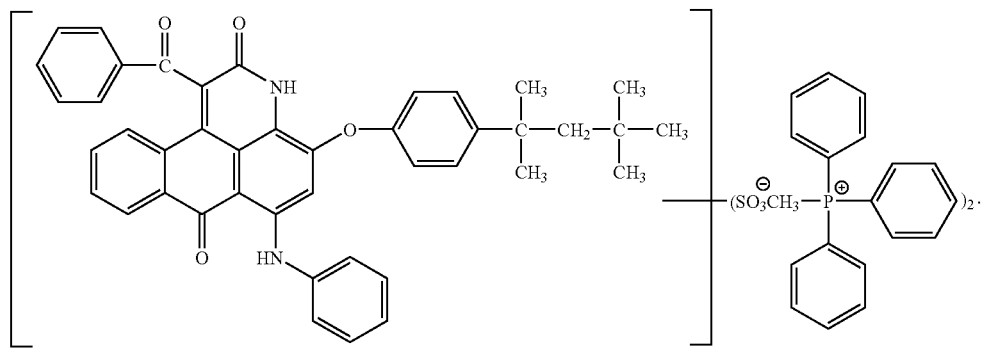

8. The ink composition according to claim 6, wherein the dye comprises a salt represented by the formula:
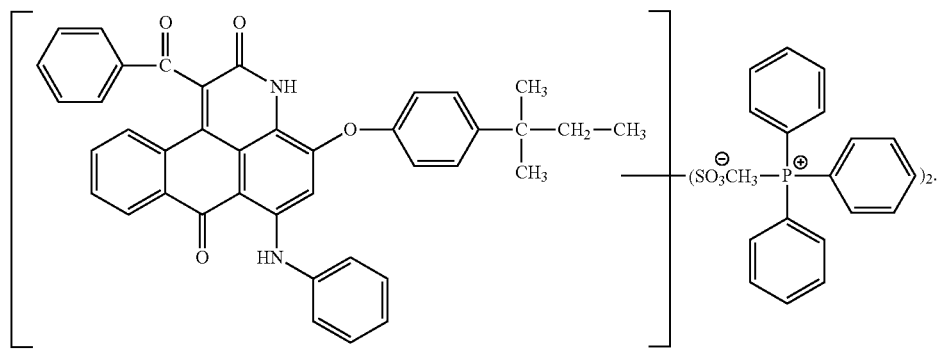
9. The ink composition of claim 1, wherein the non-aqueous carrier composition contains less than 15 mass percent of water.
10. The ink composition of claim 1, wherein the non-aqueous carrier composition contains less than 2 mass percent of water.
* * * * *